Figure 5:
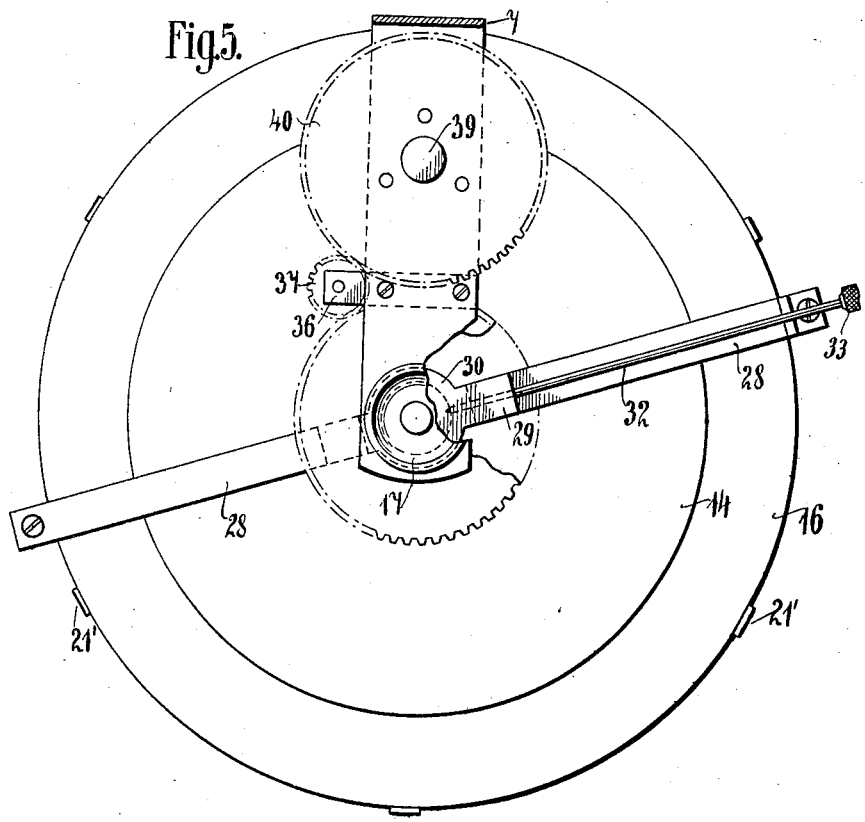

No. 865,675. PATENTED SEPT. 10, 1907.
E. VON BOMSDORFF.
ORIENTING DEVICE.
APPLICATION FILED NOV. 26, 1906.
3 SHEETS—SHEET 1.
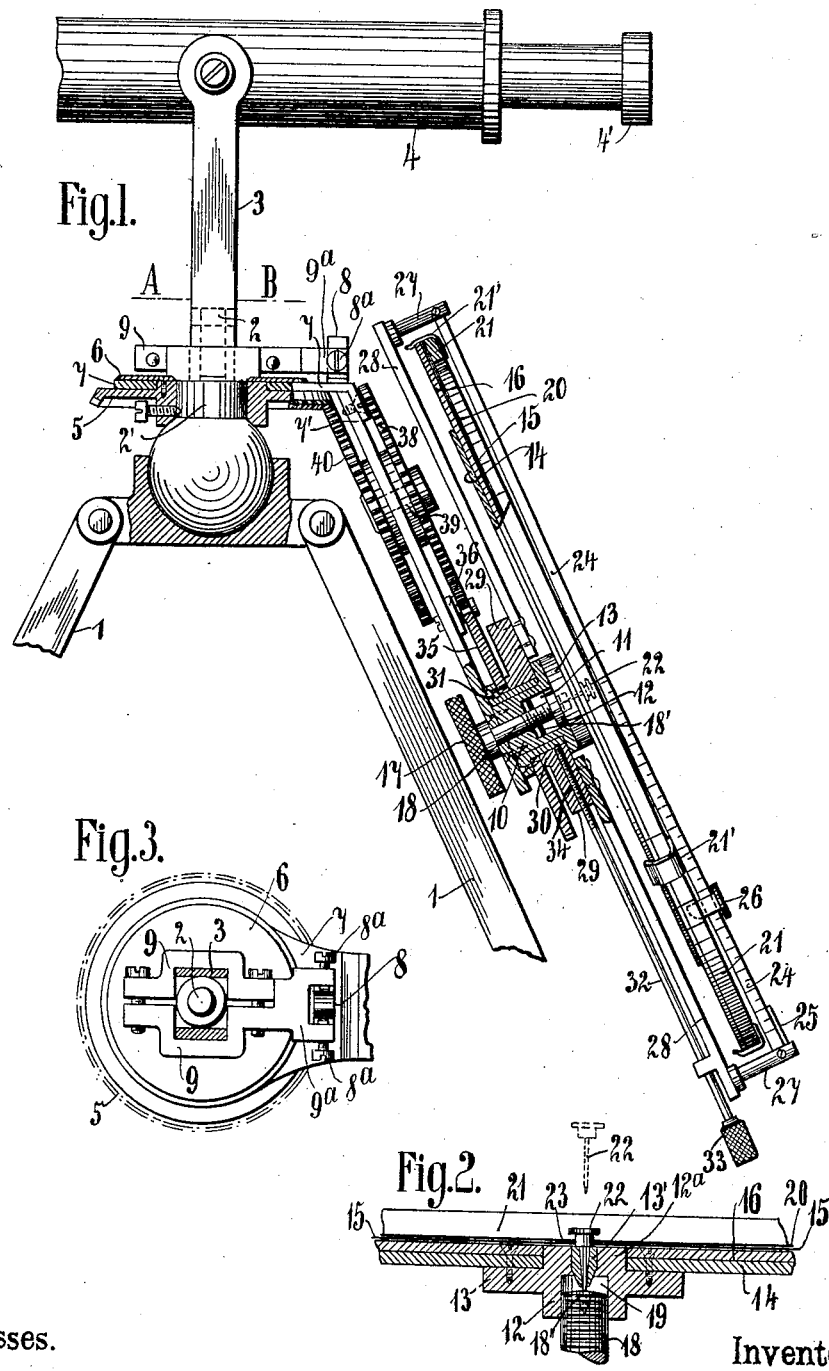
Witnesses.
Jesse N. Lutton
P. Sommers
Inventor.
Ernst von Bomsdorff
by Henry Orth Jr.
Atty No. 865,675. PATENTED SEPT. 10, 1907.
E. VON BOMSDORFF.
ORIENTING DEVICE.
APPLICATION FILED NOV. 26, 1906.
3 SHEETS—SHEET 2.
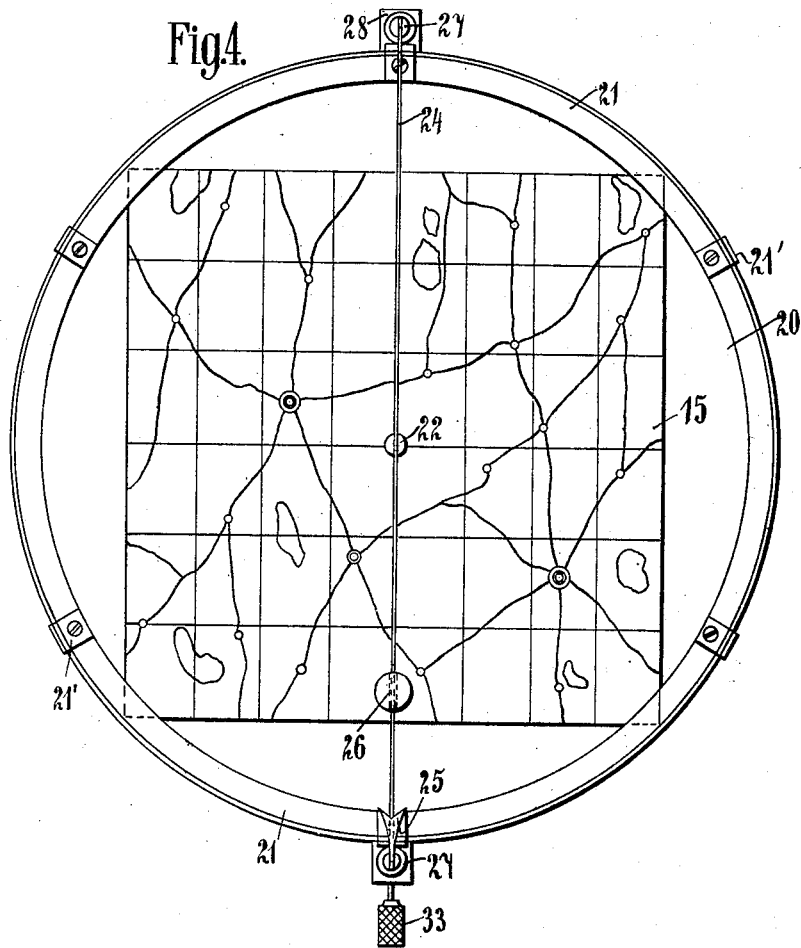
Witnesses. Inventor.

No. 865,675. PATENTED SEPT. 10, 1907.
E. VON BOMSDORFF.
ORIENTING DEVICE.
APPLICATION FILED NOV. 26, 1906.

3 SHEETS—SHEET 3.

Witnesses.

Inventor.

UNITED STATES PATENT OFFICE.

ERNST VON BOMSDORFF, OF BRESLAU, GERMANY.

ORIENTING DEVICE.

No. 865,675.      Specification of Letters Patent.      Patented Sept. 10, 1907.

Application filed November 26, 1906. Serial No. 345,225.

*To all whom it may concern:*

Be it known that I, ERNST VON BOMSDORFF, a subject of the King of Prussia, residing at 43 Goethestrasse, Breslau, Germany, have invented certain new and useful Improvements in Orienting Devices; and I do hereby declare the following to be a full, clear, and exact description of the invention.

My invention relates to orienting devices or range finders whereby the position for the time being of the range finder is indicated on the map or chart and any other position may be found on such map or chart by means of an indicator, or the indicator may be moved upon the map or chart to position the telescope on a surrounding point as will hereinafter be more fully described and claimed.

Referring to the drawings in which like parts are similarly designated, Figure 1, is a side elevation partly in section of the entire device. Fig. 2, is a sectional detail in which the means of securing the chart in central position are more clearly shown. Fig. 3, is a section on line A B, Fig. 1. Fig. 4, is an elevation of a map or chart holding device, and Fig. 5, is a rear view of the same showing the driving mechanism of the pointer.

In Fig. 1 I have shown a support which preferably but not necessarily is a tripod, in the top of which is a pin 2, connected thereon by means of the ball and socket joint; and mounted upon the pin 2, is the support 3 for the telescope 4, 4' or any other suitable device for sighting distant objects preferably provided with the usual cross hairs. The pin 2, is provided with a boss 2' adjacent the ball, on which is mounted a beveled gear 5 which boss carries a bent plate 7, 7' secured in place by washer 6 held to the boss of the beveled wheel 5 by screws or any other suitable fastenings, the two part bent plate 7, 7', being free to rotate on the boss of the stationary wheel 5. The bent plate for convenience is made with an upper part 7 having an eye that surrounds the boss of the wheel 5 and a lower inclined part 7' secured thereto, on which is mounted the chart and indicating carrier device said part 7' being inclined to the axis of the telescope and below the eye piece 4' thereof. On the part 7 is a pin 8, Figs. 1-3, over which takes the forked end 9ᵃ of a two part clamp 9, secured to the telescope support 3 by suitable screws. Taking through the forks and engaging the pin 8, on each side are set screws 8ᵃ so that when the telescope and support 3 are turned the plate 7 will move with them. Secured to the lower end 7' of the bent plate is a bushing 10 having a central recess 11 into which fits the lower boss 12 of a small plate 13. Rigidly secured to 13 is the supporting plate 14 and a card carrying disk 16, both fitting over the upper boss 12ᵃ of small plate 13, more clearly shown in Fig. 2. Passing through the end of the bent plate 7' and loosely into the bushing 10, is a screw 18 having milled head 17 said screw being provided with a stop 18' within the recess 11 and secured thereto to prevent the screw from being entirely withdrawn from the bushing. The end of the screw 18 is screwed into a threaded recess 19 in boss 12 of plate 13.

The map or chart 15 held on disk 16 is covered by a thin transparent protecting plate 20 preferably, but not necessarily, of mica which is removably held on plate 16 by means of a metal ring 21 which ring is provided at a suitable number of points around its periphery with spring metal clamps 21' that take over the edge of disk 16.

The position for the time being of the range finder as indicated on the chart or map must be approximately at the center of disk 16 and for insuring this a headed needle or pin 22 is passed through the mentioned place on the chart and stuck into a hole of a clamping part or sleeve 13' soldered in a bore 23 in plate 13 and projecting into the recess 19, the lower split end of the sleeve 13' serving to hold the needle fast.

In order that the screw 18 shall not prevent the complete insertion of the needle, the end of this screw is provided with a hole or recess 18'' into which the point of the needle may enter, see Fig. 2. In front of the disk 16 is a thin metal indicator strip held on edge and preferably extending diametrically across the same, provided with an index point 25 at its lower end, showing the direction of view across the map 15, Fig. 4, and between the middle and the index point 25, the strip is graduated as shown at 24, either on one or both sides thereof corresponding to the scale of the chart. Adjustable along the strip 24 is a position marker 26 which can be set to any desired point on the chart along the strip 24.

The ends of the indicator strip 24 are secured in pins 27 at opposite ends, which pins are mounted on the outer ends of arms 28 below the disk 16, said arms being secured to projections 29 on a ring 30, Fig. 1 and 5, rotatable on a sleeve 31 that is mounted on the bushing 10. A rod 32, supported under one of the arms 28 at its outer end, has a milled head 33 and a threaded end 34 passing through the ring 30 and is adapted to lock this ring to the sleeve 31 so that the strip 24 may move in unison with the sleeve and a gear wheel 35 secured to the sleeve. The gear wheel 35 engages with a smaller gear 37 rotatable on a piece 36 secured to the part 7'. The pinion 37 gears with a gear wheel 38 mounted on the axle or pin 39 which passes through the portion 7' and has mounted on it on the lower end a gear wheel 40 which gears with the beveled gear 5 so that when the telescope is turned on its axis the plate 7, 7', moves with it and the gear wheel 40 rolls on the beveled wheel 5 and drives gear wheel 38, pinion 37 and gear wheel 35 to rotate the arms 28 and the strip 24 about the center of disk 16, the gears being so proportioned and arranged that the strip 24 will move through the same angle and in the same direction as the telescope and indicate the direction of sight across the chart.

The method of using the apparatus and its operation are as follows:—The map of the neighborhood in which an orientation is desired, is, as already stated, so arranged upon the plate or disk 16 that the station of the apparatus for the time being upon the map lies accurately in the center of the disk 16 which center coincides with the axis of rotation of the pointer 24. To enable this to be rapidly and conveniently effected, the disk is removed from the apparatus. For this purpose the screw 18 is loosened and the disk 16 raised a little so that the projection 12 is brought out of the recess 11 of the boss 10 after which the plate 16 is withdrawn sidewise from beneath the pointer 24 which is an elastic or yielding band. After the ring 21 and the transparent mica plate 20 have been removed the map 15 is arranged in a simple and rapid manner in the desired position upon the plate 16 by thrusting the needle 22 through the point on the map which corresponds to the station of the apparatus and then thrusting the needle into the clamping device 13' (Fig. 2). The map 15 may be as large as desired as it can be so folded that the piece visible just covers the disk 16. When the map 15 has been secured by the needle 22 the transparent plate 20 and the ring 21 are again placed upon the disk 16 and the disk is again secured to the angle plate 7 by being pushed under the pointer 24 and the projection 12 being pressed into the recess 11, the screw 18 being finally screwed into the hole 19. Before the screw 18 is tightened up however the disk 16 is turned, should occasion require it, so that the map 15 is brought into the correct position opposite the observer, that is to say a position in which the northern part of the map lies at the top. If, after the map 15 has been arranged upon the disk 16 in the manner described, the apparatus is to serve for the determination upon the map of the position of a fixed point in the territory, such as for example the position of a hill occupied by a battery, then the telescope 4 is first directed upon any other desired point in the territory the position of which upon the map is known, for example a known village, and then the pointer 24, after loosening the screw spindle 32, is so adjusted that its half which carries the direction indicator 25 passes through the known point mentioned i. e. the village. Then after the screw spindle has been tightened up again the apparatus is ready for use. To find out upon the map any desired point in the territory it is merely necessary to adjust the telescope 4 towards this point; the pointer 24 which always moves in correspondence with the telescope 4 will then cut the point sought upon the map, so that the point can be easily determined upon the map by estimating the distance in the territory. The marking slide 26 is then set upon the point in question of the map 15 and then the length of the distance of this point from the station of the apparatus read off upon the pointer scale. When the pointer 24 has been once correctly set, then any desired point in the territory can be determined upon the map in the manner hereinbefore described by directing the telescope 4 upon the particular point in the territory and determining the point sought upon the map by the help of the pointer 24. Conversely a given point on the map may be determined in the territory by means of the new apparatus. In this case it is only necessary to rotate the telescope 4 until the pointer 24 cuts the corresponding point on the map, the point sought in the territory then lies in the line of sight of the telescope 4.

The new apparatus is particularly suitable for military purposes but may also be used for other purposes such as tourist purposes or the like. Thus for example the apparatus may be set up on a lookout point and may serve to determine upon the map any desired points in the surrounding territory, or conversely may serve for determining in the territory any desired points on the map.

The new apparatus is distinguished by its simple and convenient manipulation and enables the desired point to be rapidly determined upon the map or in the territory. In consequence of the map plate or disk 16 being arranged obliquely below the eyepiece 4' of the telescope the territory can be observed through the telescope 4 and the map 15 looked at in rapid succession, while in consequence of the adjustability of the pointer 24 this pointer and the map can be rapidly and accurately brought into the correct relative position. The removability of the disk 16 enables the map to be conveniently arranged thereon, and by securing the needle 22 by a clamping device any movement of the point on the map corresponding to the station of the apparatus out of the axis of rotation of the pointer 24 is prevented. The slide 26 and the scale provided on the pointer 24 facilitate the determination of the distance of the point sought from the station of the apparatus.

Having now particularly described and ascertained the nature of the said invention and in what manner the same is to be performed, I declare that what I claim is:—

1. In an orienting device the combination with a sighting device and a map carrier movable with the sighting device, of an indicator rotatable in front of a map carrier and mechanism operatively connecting the indicator and the sighting device to maintain the indicator across the map in the relative line of sight.

2. In an orienting device the combination with a telescope movable around a vertical axis and a map carrier connected to and movable with the telescope; of an indicator and mechanism to impart to the indicator the same angular movements as the telescope and means to independently move the indicator.

3. In an orienting device, the combination with a telescope support and a telescope movably mounted thereon, of a chart carrier movable in unison with the telescope, an indicator movable over the chart, and coöperating means on the carrier and support to actuate the indicator by the movement of the telescope and carrier.

4. In an orienting device the combination with a telescope and a normally stationary plate, a sleeve split at its end secured in the center thereof, a pin adapted to pass into and be held by the split end of said sleeve, an indicator strip and means to impart angular movement thereto corresponding to the horizontal angular movement of the telescope.

5. In an orienting device the combination with a telescope; of an angle plate connected thereto and partaking of the horizontal movements of the telescope, a fixed gear concentric with the vertical axis of rotation of the telescope, an indicator and gearing between the fixed gear and indicator to impart like angular movements to the indicator when the telescope is moved.

6. In an orienting device the combination with a telescope; of a map or chart carrier in an inclined position beneath the eye piece of the telescope, an indicator and mechanism to impart the same angular movements thereto as the angular movements of the telescope when moved.

7. In an orienting device the combination with a telescope movable about a vertical axis, of a bevel gear wheel fixed concentric with said vertical axis, a strip fixed to move with the telescope, a removable map supporting plate secured to the strip, an indicator mounted to rotate about the axis of the plate and mechanism to impart the same angular movement to the indicator on the telescope, and means to permit the movement of the strip independent of the telescope.

In testimony whereof I have signed my name to this specification, in the presence of two subscribing witnesses.

ERNST VON BOMSDORFF.

Witnesses:
ERNST KATZ,
ERNST BLEISCH.